United States Patent [19]

Meister et al.

[11] Patent Number: 5,194,552

[45] Date of Patent: Mar. 16, 1993

[54] **SOLUBLE, SOLID OR CROSSLINKED GRAFT COPOLYMERS OF LIGNIN (2-PROPENAMIDE)-(2-METHYL-3-OXO-4-OXYBUT-1-ENE-(P-ETHOXY-(3*P+3)-OL), METHODS OF MAKING THE SAME AND USES THEREFORE**

[76] Inventors: John J. Meister, 31675 Westlady Rd., Beverly Hills, Mich. 48010-5624; Amit Lathia, 2379 Mt. Hope, Okemos, Mich. 48864; Fu-Fong Chang, 147-45 84th Ave., Kew Garden, N.Y. 11435

[21] Appl. No.: 859,157

[22] Filed: Mar. 27, 1992

Related U.S. Application Data

[62] Division of Ser. No. 601,198, Oct. 22, 1990, Pat. No. 5,116,904.

[51] Int. Cl.$^5$ .................. C08H 5/02; C08G 63/91
[52] U.S. Cl. ................................ 527/400; 525/8
[58] Field of Search ........................ 525/8; 527/400

[56] References Cited

U.S. PATENT DOCUMENTS 4,889,902 12/1989 Meister .......................... 527/400

Primary Examiner—Joseph L. Schofer
Assistant Examiner—Wu C. Cheng
Attorney, Agent, or Firm—Barnes, Kisselle, Raisch, Choate, Whittemore & Hulbert

[57] ABSTRACT

A soluble, solid, or crosslinked graft copolymer of lignin-(2-propenamide)-(2-methyl-3-oxo-4-oxybut-1-ene-(p-ethoxy-(3*p+3)-ol) having a central lignin network and at least one grafted side chain, R, having randomly repeating units of the formula:

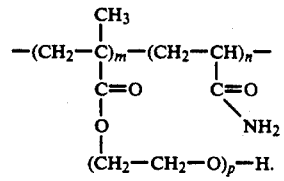

such that the central lignin network has a molecular weight of about 1,000 to 150,000; the number of ethoxyl repeat units, p, in the polyol repeat unit is between 1 and 300,000; and the total number of random units in the grafted side chain, n+m, or chains, x*(n+m), is in the range of 1 to 300,000 units, such that the total copolymer molecular weight is in the range of 1,000 to 300,000,000.

The copolymers of the present invention are useful as 1) thickeners for water and aqueous solutions or 2) plastics and elastomers.

11 Claims, No Drawings

SOLUBLE, SOLID OR CROSSLINKED GRAFT COPOLYMERS OF LIGNIN (2-PROPENAMIDE)-(2-METHYL-3-OXO-4-OXYBUT-1-ENE-(P-ETHOXY-(3*P+3)-OL), METHODS OF MAKING THE SAME AND USES THEREFORE

REFERENCE TO CO-PENDING APPLICATION

This is a divisional of copending application Ser. No. 07/501,198 filed on Oct. 22, 1990, now U.S. Pat. No. 5,116,904.

Field of the Invention

The present invention relates to soluble, solid, or crosslinked graft copolymers of lignin (2-propenamide)-(2-methyl-3-oxo-4-oxybut-1-ene-(p-ethoxy-(3*p+3)-ol), methods of making the same and uses therefore.

BACKGROUND OF THE INVENTION

Aqueous solutions which flow at a controlled rate under a given shear stress are required throughout a variety of industrial applications. Simultaneously, there is enormous need for materials that are ductile at room temperature and can be molded into articles of manufacture or complex shapes. This invention will disclose a unique class of materials that are useful in both applications.

The control of viscosity of water is achieved by adding to water agents, such as clays, amounts of polar organic compounds, such as polyacrylates, or high concentrations of salts. With the appropriate additives, these aqueous solutions can suspend large amounts of a solid phase and form a thermodynamically stable mixture. These aqueous solutions suspend finely divided solids and will flow slowly when exposed to shear stress. Such solutions, free of solids, also flow more uniformly in situations where numerous paths providing different resistances to flow, are open to the fluids.

When a solid must be formed, the materials used to control fluid flow are, generally, not considered. This is because the fluid flow agents form brittle or hydroscopic solids that decompose instead of becoming extrudable when heated. Since materials that can be re-formed into articles of manufacture just by heating and plastic processing are very desirable, a large class of compounds which exhibit this behavior have been invented.

However, each of the conventional agents for flow control or solid formation has attendant disadvantages. Hence, a need continues to exist for new agents which are capable of suitably thickening water and aqueous solutions or making objects of manufacture with functional strength and resistance properties. Further, most of the polymeric compounds used in flow control or article manufacture are made from expensive, petrochemical-derived, synthetic chemicals rather than cheaper natural compounds like lignin. Compounds which contain large amounts of lignin are desirable, cheap products because of low raw materials cost. Lignin-containing materials also have a two part structure with the lignin and synthetic parts of the compound tending to phase separate or seek different chemical environments. This difference in affinities produces surface activity which allows the production of very novel thickening agents or plastics. Thickening agents, flow control agents, and thermoplastic solids containing large amounts of lignin are desirable materials because of surface activity, chemical properties, and low materials cost.

Accordingly, it is an object of the present invention to provide a lignin graft copolymer. It is also an object of the present invention to provide processes for preparing the lignin graft copolymer. Moreover, it is also an object of this invention to provide a method for using the above lignin graft copolymer in preparing plastics, both directly and by reacting the lignin polyol with isocyanates to form lignin-containing urethanes. When the products of this invention contain high 2-methyl-3-oxo-4-oxybut-1-ene-(p-ethoxy-(3*p+3)-ol content, the copolymers are crosslinked solids useful in the formation of objects of manufacture. Further, it is also an object of the present invention to provide a method of boosting or enhancing polymer molecular weights during polymerization reactions and lowering polymer glass transition temperatures.

SUMMARY OF THE INVENTION

According to the present invention, the foregoing and other objects are attained by providing a graft copolymer of lignin-(2-propenamide)-(2-methyl-3-oxo-4-oxybut-1-ene-(p-ethox y-(3*p+3)-ol) having a central lignin network and at least one grafted side chain, R, having randomly repeating units of the formula,

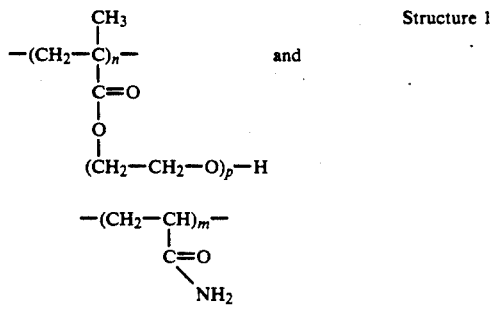

Structure 1 such that the central lignin network has a molecular weight of about 1,000 to 150,000. The number of ethoxyl repeat units, p, in the polyol repeat unit is between 1 and 300,000. The total number of random units in the grafted side chain equals the sum of n plus m. The total number of monomer repeat units in the molecule, x*(n+m), is in the range of 1 to 300,000 units, such that the total copolymer molecular weight is in the range of 1,000 to 300,000,000 and x, the number of side chains on the lignin backbone, is in the range of 1 to 500. The formula 3*p+3 for a chain containing "p" ethoxy repeat units, where p is an integer varying from 1 to 300,000, gives the chain position number of the atom connected to a terminal, primary hydroxyl group, O—H.

DETAILED DESCRIPTION OF THE PREFERRED EMBODIMENTS

In accordance with the present invention, there is provided a high molecular weight graft copolymer containing lignin as the backbone network and poly ((1-amidoethylene)-co-(1-methyl-1-(1-oxo-2-oxy-(p-(3-oxypropl)))ethylene)) as the grafted side chain.

Lignin is derived from woody plants. In fact, after cellulose, it is the principal constituent of the woody structure of higher plants. Lignin, which makes up between 15 and 30 percent of the weight of dry wood, acts as a cementing agent to bind the matrix of cellulose fibers together into a rigid woody structure. Lignin can be and is obtained from grasses (i.e , bamboo), softwoods (i.e., pine), and hardwoods (i.e., poplar).

Moreover, lignin sources are abundant. Although the wood and bark waste from the lumber industry and wastes from agricultural operations could provide extremely large quantities of lignin, perhaps the most accessible, albeit smaller, source is the pulp and paper industry. In the late 1980's, the pulp and paper industry was producing approximately 24 million metric tons of lignin a year.

In general, the molecular structure of the repeating lignin units and the appropriate numbering thereof is as follows:

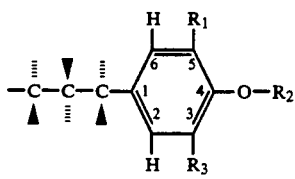

Lignin, apparently regardless of origin, is, in generally, a complex, oxyphenylpropylene polymer. In the natural state, lignin is a highly branched and partially cross-linked polymer. However, there appears to be come structural variation in branching depending upon whether the lignin is derived from coniferous or deciduous species or from bark, cambium, sapwood or heartwood. Repeat unit structure of the polymer also varies with source of lignin with $R_1$ and $R_3$ in the above formula usually being hydrogen, H, in grasses; $R_1$ usually being hydrogen and $R_3$ usually being a methoxyl group in softwoods; and $R_1$ and $R_3$ being methoxyl groups, $-OCH_3$, in hardwood;. The propene usually being methoxyl groups, $-OCH_3$, in hardwoods. The propene group often has a hydroxyl group attached in place of one hydrogen. Alkyl groups appear on some of the aromatic groups in the polymer and sulfur may be chemically bound to parts of the polymer. Bonding between repeat units in lignin is complex and involves carbon-carbon bonds between aromatic and/or alkyl carbons as well as ether bonds between aromatic and/or alkyl carbons. Labile hydrogens exist in the material and may be replaced by metal cations, such as sodium, potassium, calcium, or ammonium ions, to form lignin salts.

During recovery, the lignin is chemically altered and is available in relatively pure form as a derivative having a molecular weight of about 1,000 to 150,000. Of the lignins which may be used according to the present invention, there may be mentioned alkali lignins, HCl lignins, acid lignins, Klassen lignins, solvent-extracted lignins, steam-explosion lignins, milled wood lignins (MWL) and 1,4-dioxane lignins, for example, with each lignin named according to the method of recovery used to obtain it. Methods for recovering lignin are the alkali process, the sulfite process, ball milling, enzymatic release, hydrochloric acid digestion, and organic solvent extraction. Alkali lignins are produced by the kraft and soda methods for wood pulping. They have low sulfur content (<1.6 wt. %), sulfur contamination present as thioether linkages, and are non-ionic polymers of low (2,000 to 15,000) molecular weight. Alkali lignins are tan, brown or black powders. When free of metal cations, such as sodium or potassium, alkali lignins are water-insoluble materials and are commonly called "free-acid" or "acid free" lignin. When containing metal cations, such as sodium or potassium, the alkali lignins are slightly water soluble materials which increase in water solubility as the pH increases from 7 toward 14 and become completely soluble in 5 weight percent, aqueous sodium hydroxide solutions. Approximately 22 million metric tons of kraft lignin are produced in the United States each year.

The sulfite process for separating lignin from plant biomass produces a class of lignin derivatives called lignosulfonates. Lignosulfonates contain approximately 6.5 weight percent sulfur present as ionic sulfonate groups. These materials have molecular weights up to 150,000 and are very water-soluble. Lignosulfonates are used in resource recovery as cement grouting agents, sacrificial agents in EOR, and thinning agents in drilling muds. The material is therefore directly utilized in energy recovery.

Milled wood lignin (MWL) is produced by grinding wood in a rotary or vibratory ball mill. Lignin can be extracted from the resulting powder using solvents such as methylbenzene or 1,4-dioxacyclohexane. Milling only releases 60 weight percent or less of the lignin in wood, disrupts the morphology of lignin in wood, and may cause the formation of some functional groups on the produced lignin. Despite these limitations, milling appears to be an effective way of recovering lignin from plants with only slight alternation. Enzymes which hydrolyze polysaccharides can be used to digest plant fiber and release lignin. After digestion, the lignin is solubilized in ethanol. Extensive analytical studies support the idea that enzymatically produced lignin has undergone no major modification in removal from plant material. Milling and enzyme release are not commercial methods to recover lignin at present but the commercialization of ethanol from biomass processes may make enzyme lignin available in large quantities.

Acid hydrolysis of the polysaccharide portion of wood will release lignin but also causes major condensation reactions in the product. These reactions can be minimized by using 41 weight percent hydrochloric acid in place of other mineral acids but some condensation reactions still occur. This is not an effective method by which to obtain unaltered lignin. On the other hand, lignin can be solvent extracted from wood at a temperature of 175° C. using solvent mixtures such as 50/50 by volume water/1,4-dioxacyclohexane. Changes in lignin under these conditions appear to be minor. Steam explosion lignins are prepared from steam explosion pulp by any of the lignin extraction methods described previously. Steam explosion pulp is made by heating wood to a temperature at which water would boil if exposed to the conditions which prevail in the next stage of the production process. The wood is then thrust into this "next stage" and the spontaneous formation of steam bursts the wood and produces a pulp.

All of these lignins can be used as raw materials for graft copolymerization and none is automatically preferred over the others. Choice of lignin to be used in the reaction is made on the basis of availability, cost, and the properties desired in the final copolymer. When the product to be made is to have high molecular weight, a high molecular weight lignin is usually chosen as a starting material. If the product to be made is to have low molecular weight, a low molecular weight lignin is usually chosen as a starting material. If the product to be made is to be a highly ionic, conducting copolymer;

a highly ionic, conducting lignin such as a lignosulfonate is usually chosen as a starting material. If the product to be made is to be a non-ionic thermoplastic, a non-ionic lignin is usually chosen as a starting material. Rules such as these are generally indications of how to choose a lignin for use in the grafting reaction and are the technical underpinning by which the examples, to be shown later, are designed.

Since the lignins separated from the plant may be chemically altered somewhat from that found in the plant, the term "lignins," as used herein, means the lignin products which are obtained upon separation from the cellulose or recovered from the plant. In the sulfite pulping process, the lignocellulosic material is digested with the bi-sulfite or sulfite resulting in the sulfonation of the lignins. In other methods of the recovery or separation of the lignins from the plant, the lignins may not be sulfonated but may be chemically altered somewhat in some other manner.

In accordance with the present invention, to the lignin macromolecule, possibly to the aromatic ring of the oxyphenylpropylene moiety, is grafted repeating units of 1-amidoethylene:

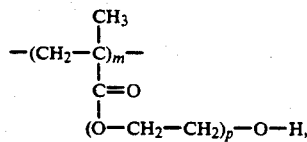  Structure 2 in combination with repeating units of 1-methyl-1-(1-oxo-2-oxy-(p-(3-oxypropyl)))ethylene,

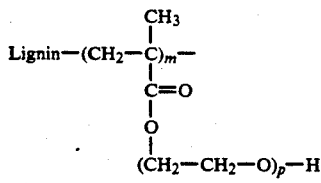  Structure 3 where m, n, and p are integers showing the number of repeat units of the structure preceding the integer in the molecule. The values of m, n and p vary from 0 to 300,000.

For example, when using alkali lignins in accordance with the present invention, a lignin graft copolymer of the following formula is produced:

Structure 4

Lignin—$(CH_2-\underset{\underset{\underset{(CH_2-CH_2-O)_p-H}{|}}{\underset{O}{|}}}{\underset{C=O}{|}}{\overset{CH_3}{|}}C)_m$—

In this structural formula, the subscripts m and n are used to show that large numbers of these repeat units can be attached to the lignin backbone but the formula does not mean that these repeat units occur in strings of one type followed by strings of another type. Usually, the graft copolymers formed have random copolymer side chains with the two repeat units occurring in random sequence in the chain. One side chain is shown in structure 4 but the copolymer may have a number of sidechains, x, where x is an integer between 1 and 500. The subscripts n, m, and p are integers varying between 1 and 300,000. The preparation of this copolymer is accomplished, in general, under oxygen-free conditions by adding a redox initiator; a halide salt; 2-propenamide,

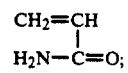

and a 2-methyl-3-oxo-4-oxybut-1-ene-(p-ethoxy-(3*p+3)-ol),

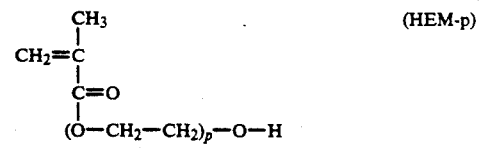  (HEM-p)

to a lignin dispersion in a suitable solvent and allowing time for graft polymerization to occur. The formula 3*p+3 for a chain containing "p" ethoxy repeat units, where p is an integer varying from 1 to 300,000, gives the chain position number of the atom connected to a terminal, primary hydroxyl group, O—H. The way this formula works is shown in structure 5. The monomer structure labeled HEM-p above represents a broad class of polyols commonly called ethoxylated methacrylate esters. The correct nomenclature for these compounds is complicated since every addition of another ethoxyl group, O—$CH_2$—$CH_2$, increases the main carbon chain of the molecule by three units and thereby alters the chain name. Three typical named structures are shown below with the proper names and HEM abbreviation given after each structure.

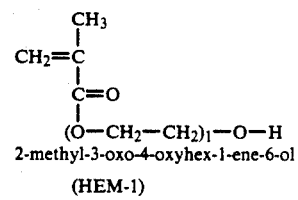  Structure 5

2-methyl-3-oxo-4-oxyhex-1-ene-6-ol (HEM-1)

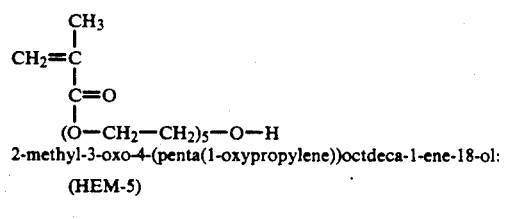

2-methyl-3-oxo-4-(penta(1-oxypropylene))octdeca-1-ene-18-ol:

(HEM-5)

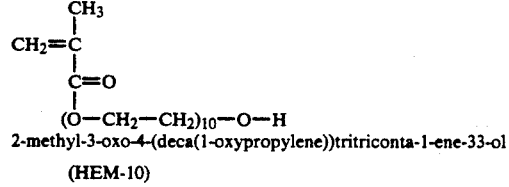

2-methyl-3-oxo-4-(deca(1-oxypropylene))tritriconta-1-ene-33-ol (HEM-10)

Note that the change of structure produced in the ethoxylated monomer by polymerization can be indicated by denoting the repeat unit of structure 3 as HEM'-p, where the ' indicates double-bond-opening polymerization.

Preparation of alkali lignin-(2-propenamide)-(2-methyl-3-oxo-4-oxybut-1-ene-(p-ethoxy-(3*p+3)-ol) graft copolymer in solvent will now be illustrated for a sample composed of between 0.32 and 20.0 weight percent lignin, 0.1 and 10 weight percent hydroperoxide, 0.0, (trace or minute nearly not measurable amount), and 10 weight percent 2-propenamide, 0.0, (trace or minute nearly not measurable amount), and 10.0 weight percent 2-methyl-3-oxo-4-oxybut-1-ene-(p-ethoxy-(3*p+3)-ol, 0.6 to 10 weight percent calcium halide, and 50 to 97 weight percent solvent. The general reaction can be written,

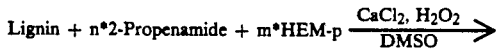

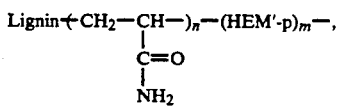

where, in the formula of th above reaction equation, one sidechain is shown but the copolymer may have a number of sidechains, x, where x is an integer between 1 and 500. The subscripts n, m, and p are integers bounded by 1 and 300,000.

The solution polymerization method to conduct this synthesis will now be described.

The method of preparing a copolymer of lignin basically comprises:
1) providing an oxygen free environment;
2) forming a reaction mixture of:
   a) a lignin source
   b) a redox initiator
   c) a halide salt
   d) a monomer consisting of one or both of 2-propenamide and 2-methyl-3-oxo-4-oxybut-1-ene-(p-ethoxy-(3*p+3)-ol;
3) allowing the reagents to react; and
4) recovering the product.

As a suitable solvent for the graft copolymerization of the present invention, it should be noted that, in general, organic solvents are used and, of these, the polar, aprotic solvents are preferred. Particularly noteworthy are the solvents dimethyl sulfoxide (DMSO), dimethyl acetamide (DMAc), dimethyl formamide (DMF), 1,4-dioxane, 1-methyl-2-pyrrolidianone and pyridine. Of course, mixtures of these solvents can also be used such as 50/50 (vol/vol) mixtures of DMSO and 1,4-dioxane. However, it is also possible to use 50/50 (vol/vol) mixtures of one of the above solvents, such as DMSO, with water. A selection of suitable solvents for the graft copolymerization are shown in Table 1.

TABLE 1

| Liquids Useful in Solution Polymerization of Graft Copolymers | |
|---|---|
| Dimethyl Sulfoxide[a] (DMSO) | Dimethylacetamide |
| 1,4-Dioxacyclohexane | Dimethylformamide |
| Water | 1-Methyl-2-pyrrolidinone |
| Pyridine | |

[a]Most frequently used liquids given in bold print.

An aliquot of about 20 mL of purified solvent is placed in a 125 mL conical flask or stopperable test tube. Lignin and finely ground anhydrous calcium halide salt, chloride salt preferred, are added to the pure solvent and the mixture is stirred to dissolve the solids while being bubbled with nitrogen. The halide salt can be selected from calcium, magnesium, sodium, potassium, or lithium chloride; calcium, magnesium, sodium, potassium, or lithium bromide; or calcium, magnesium, sodium, potassium, or lithium fluoride. The choice of lignin is apparently general. It is general in that a whole series of lignins withdrawn from wood by different techniques have been grafted by this method, as shown by the date of Table 2.

TABLE 2

| Lignins Grafted With This Chemistry Source | | |
|---|---|---|
| Pine[a] | Aspen[b] | Yellow Poplar[c] |
| Oak | Bagasse | Bamboo |
| Extraction Method | | |
| Kraft | Solvent Extracted | Steam Exploded |
| Glycol | Base Extracted | |

[a]Pine lignins from the Westvaco Corporation of Charleston, S.C.
[b]Aspen lignin from the Solar Energy Research Laboratories of Golden, CO.
[c]Yellow poplar lignins from BioRegional Energy Associates of Floyd, VA.

After 10 minutes of nitrogen saturation, a hydroperoxide such as hydrogen peroxide or 2-hydroperoxy-1,4-dioxycyclohexane is added to the reaction mixture. A selection of suitable hydroperoxides for the graft copolymerization are shown in Table 3.

TABLE 3

| Hydroperoxides Useful in Polymerization of Graft Copolymers | |
|---|---|
| hydrogen peroxide | 2-hydroperoxy-1,4-dioxycyclohexane |
| 3,3-dimethyl-1,2-dioxybutane | |
| Anhydrous Solid Peroxides | |
| sodium peroxyborate | magnesium peroxyphthalate |
| sodium percarbonate | |

This addition can be made by adding an aqueous solution of the peroxide for safe handling or the peroxide can be added directly. Prepare and saturate with nitrogen two additional flasks containing:
Flask 2: 2-Propenamide and HEM-p in solvent and
Flask 3: 2-Propenamide in solvent Stir the lignin solution for 5 minutes, add the contents of Flask 3 to Flask 1, stir for about 3 minutes, add the contents of Flask 2 to Flask 1, and stir for an additional 5 minutes. All materials can be at room temperature or below. Allow the reaction to proceed while Flask 1 rests in a constant temperature water bath. The temperature of the bath should be within 20° C. of room temperature. The reaction flask is allowed to stir during the reaction. The rate of stirring depends upon the amount of monomer in the monomer mixture and the shape and structure of the reaction vessel. The reaction vessel need not be stirred to create copolymer but better yields are obtained from stirred reactions. The stirring rate and force will depend on 1) the amount of polyol monomer in the monomer mixture with higher mole fractions of polyol requiring higher rates of stirring and 2) the shape and structure of the reaction vessel. The reaction mixture should have a shear rate perpendicular to the direction of stirred flow of between 0.01 per second and 6,000 per second. High shear rates in the reaction should be avoided because they will cause the formed polymer to mechanically degrade. The preferred stirring rate in the conical flask used in laboratory synthesis is 1 to 5 Hertz. This produces a shear rate of approximately 10 to 200 per second in the reaction mixture and this is the preferred shear rate for high yield synthesis. If the reaction is stirred, it is possible to add all of the monomer(s) in one batch and to avoid preparing separate flasks of monomer and monomer mixture.

The reaction starts immediately. The flask contents will often thicken slowly but may even solidify into a precipitate-laden, viscous slurry. After quenching by opening the vessel or with hydroquinone, the product is diluted with water and subjected to centrifugation. The centrifugation gives two portions: water soluble and water insoluble. Each portion is dialyzed and freeze-dried to give products. Yield is calculated from the formula: (g=grams)

$$\text{weight percent yield} = \frac{(\text{g polymer recovered})}{\text{g lignin added} + \text{g monomer added}}$$

It is preferred that all reagents used be of reagent grade purity but less pure materials may be used if they do not contain inhibitors for the reaction. Other changes in this procedure, evident to those skilled in synthesis or chemical manufacture can be made. The graft copolymer can also be produced by adding nitrogen-saturated 2-propenamide to the reaction mixture in another solvent.

The graft copolymerization reaction can be conducted with or without stirring once the monomer and metal salt have been dispersed in the reaction mixture. However, higher yield and higher polyol repeat unit content can be obtained from stirred reactions. The reaction is allowed to proceed for 1 to 200 hours, with 48 hours being a typical reaction time. It is preferred to terminate the copolymerization by addition of a free radical scavenger such as hydroquinone.

The graft terpolymer is easily recovered from a liquid reaction mixture. If the reaction mixture is a gel or thick slurry, it can be made pourable by mixing therewith 1 to 3 times its volume of distilled or deionized water under low shear conditions until a homogeneous, pourable system is formed. The mixture is added to 2–10, preferably 5–10, times its volume of a nonsolvent for the polymer, such as 2-propanone. Preferably, the nonsolvent is stirred vigorously so as to form a vortex and the copolymer solutions is slowly drained directly into the center of this vortex. The precipitated graft copolymer is then removed from the nonsolvent solution by filtration, washed with nonsolvent, filtered, and vacuum-dried to a constant weight. A purer product can be obtained by the dialysis-freeze drying process described above. If the reaction product is crosslinked, the product is dried to form a solid block of polymer.

The following examples illustrate certain embodiments of this invention wherein parts and percentages are by weight and temperatures are in centigrade unless otherwise indicated. Indulin AT(1-134-3 and 4), a commercial lignin product of the Westvaco Corporation Chemical Division, P.O. Box 5207, North Charleston, S.C. 29406 and Eastman reagent-grade 2-propenamide were used in these syntheses. Other lignins (25-116-A and 31-10-1) were supplied by BioRegional Energy Associates of Floyd, Va.

| ELEMENTAL ANALYSIS OF LIGNIN | | | | | |
|---|---|---|---|---|---|
| | C | H | N | O | S |
| 25-116-A LIGNIN | 62.15 | 5.96 | 0.54 | 29.64 | 0.11 |
| 31-10-1 | 56.08 | 5.59 | 0.65 | 37.13 | 0.09 |

STEAM EXPLODED LIGNIN WAS SUPPLIED BY BIO-REGIONAL ENERGY ASSOCIATES. SAMPLE 31-10-1 WAS EXTRACTED FROM BIO-REGIONAL ENERGY ASSOCIATES, STEAM EXPLODED PULP USING AQUEOUS ALKALI. ANALYSES BY CANADIAN MICROANALYTICAL SERVICES, LTD.

The monomer HEM-5 was Sipomer HEM-5, polyethylene glycol methacrylate, as supplied by Alcolac Chemical Company, 3440 Fairfield Road, Baltimore, Md., 21226. The monomer was labeled 28-19-1, was from Lot B-658-18, and has a CAS registry number of 25736-86-1. It is 2-methyl-3-oxo-4-(penta(1-oxypropylene))octadeca-1-ene-18-ol, (HEM-5). The monomer HEM-10 was Sipomer HEM-10, polyethylene glycol methacrylate, as supplied by Alcolac Chemical Company. The monomer was labeled 28-20-1 and has a CAS registry number of 25736-86-1. It is 2-methyl-3-oxo-4-(deca(1-oxypropylene))tritriconta-1-ene-33-ol, (HEM-10). Dimethyl sulfoxide, of reagent grade, from Mallinckrodt Chemical Company and anhydrous calcium chloride also therefrom were used in these experiments. The hydroquinone solution was 1 weight percent hydroquinone in distilled water.

The present invention will now be further illustrated by certain examples and references which are provided for purposes of illustration only and are not intended to limit the present invention.

EXAMPLE 1

A total of 1.51 g of lignin and 1.50 g of calcium chloride were placed in a 125 mL erlenmeyer flask, Flask 1, containing 36 mL of dimethylsulfoxide. Flask 2 was prepared from 2.02 g of 2-propenamide (I) and 11.04 g of Sipomer HEM-5, [2-methyl-3-oxo-4-(penta(1-oxypropylene))octadeca-1-ene-18-ol, (HEM-5)](II) in 25.0 mL of dimethylsulfoxide. Flask 3 contained 0.53 g of 2-propenamide (I) in 5.0 mL of dimethylsulfoxide. The mixture of Flask 1 was stirred and bubbled with nitrogen ($N_2$) for about 10 minutes before 2.40 mL of hydrogen peroxide solution (26-9-1, 30 percent by weight), were added to the reaction mixture. $N_2$ was bubbled through the reaction mixture for about 5 more minutes before Flask 3, which had been saturated with $N_2$ for 10 minutes, was added. After about 2 minutes of stirring Flask 1 and bubbling with $N_2$, Flask 2 was added to Flask 1. After about 5 minutes of stirring and bubbling $N_2$ through he reaction mixture, Flask 1 was sealed and placed in a 30° C. bath for 2 days. The mole ration of monomer I to II in the reaction solution was 1 to 1. The molecular weight of monomer I used was 71.08 and that of monomer II was 306 g. The reaction was then terminated by adding 1.5 mL of 1 percent hydroquinone and 100 mL of water thereto. The stirred reaction mixture was dissolved in 100 mL of water and dialyzed against water for 7 days. The dilute reaction product in the dialysis tube was recovered by freeze drying and found to weigh 2.87 g. The product was labeled 28-22-1. Yield was 74.17 weight percent. The product of this example had a lignin content of 12.90 weight percent as determined by ultraviolet spectroscopy with Beer's Law calibration at 280 nm and a 2-propenamide content of 16.85 weight percent as determined by Kjeldahl analysis. Determination of polyol repeat unit content was by measurement of hydroxyl number of the product using ASTM method E-222-73A. The weight percent of polyol monomer was 65.08. A reference for Kjeldahl analysis of nitrogen content by weight percentage is *Fundamentals of Analytical Chemistry*, 2nd Ed., Skoog and West, pp 2431–246, Saunders College Publishing, (1970).

Further examples are given in Tables 4, 5, 6 and 7 with example numbers listed in parenthesis after the sample number. In these tables, the total amount of material added to three flasks is listed without a break down into separate amounts per flask. For these examples, glass transition temperature was determined by differential scanning calorimetry. Differential scanning calorimetry was run on a DuPont Model 910 DSC from −150° to 250° C. at a ramp speed of 10° C. per minute. The sample was encased in aluminum pans, run against an aluminum reference, and maintained under nitrogen during the test. Data was stored by disk by a DuPont Model 2100 Thermal Analyst equipped with four memory module control units. Transitions were processed on the Model 2100 and results displayed through the attached printer or plotter.

TABLE 4

Synthesis of Poly(lignin-g-(2-propenamide-co-polyol))@
(Five oxyethylene units per propenoic repeat unit)

| Sample Number | lignin (g) | 2-propen amide (g) | polyol type | Amount of polyol (g) | mole ratio of 2-prop. to polyol |
|---|---|---|---|---|---|
| 28-22-1(1) | 1.51 | 2.55 | HEM-5 | 11.04 | 0.99 |
| 28-22-2(2) | 1.51 | 3.51 | HEM-5 | 10.10 | 1.50 |
| 28-22-3(3) | 1.51 | 3.76 | HEM-5 | 8.70 | 1.86 |
| 28-22-4(4) | 1.51 | 6.53 | HEM-5 | 7.02 | 4.00 |
| 28-31-1(5) | — | 2.56 | HEM-5 | 11.04 | 0.99 |

@ = Amounts of various raw materials charged into the reaction: 1.5 g $CaCl_2$, 2.4 mL of $H_2O_2$ and 66 mL of DMSO were charged to all the reactions.

TABLE 5

Synthesis of Poly(lignin-g-(2-propenamide-co-polyol))@
(Ten oxyethylene units per propenoic repeat units)

| Sample Number | lignin (g) | 2-propen amide (g) | type of polyol | Amount of polyol (g) | mole ratio of 2-prop. to polyol |
|---|---|---|---|---|---|
| 28-26-1(6) | 1.50 | 1.60 | HEM-10 | 11.90 | 0.99 |
| 28-26-2(7) | 1.50 | 2.19 | HEM-10 | 11.25 | 1.44 |
| 28-26-3(8) | 1.50 | 3.23 | HEM-10 | 10.26 | 2.32 |
| 28-26-4(9) | 1.50 | 5.14 | HEM-10 | 9.73 | 3.91 |
| 28-31-2(10) | — | 1.59 | HEM-10 | 11.90 | 0.99 |

@ = Amount of various raw materials charged into the reaction: 1.5 g $CaCl_2$, 2.4 mL of $H_2O_2$ and 66 mL of DMSO were charged to all the reactions.

TABLE 6

Analysis of Poly(lignin-g-(2-propenamide-co-polyol))
(Five oxyethylene units per propenoic repeat unit)

| Sample Number | Weight Percent* 2-propen amide | lignin | polyol | Weight Percent Yield | Glass Transition °C. |
|---|---|---|---|---|---|
| 28-22-1(1) | 16.85 | 12.90 | 65.08 | 74.17 | 39.19 |
| 28-22-2(2) | 21.57 | 9.09 | 66.68 | 83.86 | 61.85 |
| 28-22-3(3) | 28.32 | 11.92 | 56.70 | 86.82 | 99.56 |
| 28-22-4(4) | 40.61 | 11.12 | 45.66 | 80.68 | 93.65 |
| 28-31-1(5) | 20.61 | — | 78.89 | 66.03 | −14.02 |

*Composition of product. Analysis data obtained by analytical techniques mentioned previously.

TABLE 7

Analysis of Poly(lignin-g-(2-propenamide-co-polyol))
(Ten oxyethylene units per propenoic repeat unit)

| Sample Number | Weight Percent* 2-propen amide | lignin | polyol | Weight Percent Yield | Glass Transition °C. |
|---|---|---|---|---|---|
| 28-26-1(6) | 11.62 | 14.59 | 77.08 | 46.13# | −19.38 |
| 28-26-2(7) | 18.32 | 13.30 | 84.48 | 63.12 | 64.72 |
| 28-26-3(8) | 24.06 | 12.09 | 63.36 | 73.98 | 96.69 |
| 28-26-4(9) | 34.01 | 10.21 | 60.02 | 76.60 | 70.13 |
| 28-31-2(10) | 13.45 | — | 88.53 | 80.50 | −41.08 |

The yield of 28-26-1 was comparatively low because one of the flasks was broken after termination of reaction.
*Composition of product. Data was obtained by various analytical techniques mentioned previously.

Note that examples 1 to 4 and 6 to 9 show that this product can be made in yields above 60 weight percent and with mole ratios of amide monomer to hydroxyl containing monomer of from 1 to 1 up to 4 to 1. Examples 5 and 10 are syntheses of homopolymer side chain without lignin in the polymer. These two materials serve as reference polymers to show the properties of the side chain. Of particular importance in Tables 5 and 6 are the glass transition temperatures which show that as ethoxylated monomer repeat unit content goes up in the copolymer, the glass transition temperature of the copolymer decreases. This novel feature of the copolymers is very important because it means that the copolymers will become fluid at lower temperatures. The high glass transition temperature of lignin, 180° to 195° C., places severe limits on how lignin can be used. At temperatures below its glass transition temperature, lignin is brittle and breaks easily. Further, it must be heated well above its glass transition temperature to be blended into other reagents in common, bulk-phase polymerization reactions such as the formation of urethanes from isocyanates and polyols. To use lignin in such a polymerization, either the lignin must be heated to about 190° C. with the expenditure of a great deal of energy and the decomposition of other reagents in the reaction or the glass transition temperature of lignin must be lowered. The chemistry demonstrated above allows the glass transition temperature of lignin to be lowered so it can be formulated into polymerizations and materials. A further novel feature of this chemistry and these materials is that as the "p" value of the HEM repeat unit is increased, the glass transition temperature of the product with the same amide to polyol mole ratio decreases. This is evident by comparison of the data of Table 6 to that of Table 7. Thus, a novel feature of this chemistry is that by increasing the "p" number of a monomer used in synthesis of the copolymer, the glass transition temperature of the copolymer will be reduced.

In the next series of reactions, the product was made by preparing three flasks each containing:
Flask 1: Lignin and $CaCl_2$ in DMSO
Flask 2: 2-Propenamide and HEM-5 in DMSO
Flask 3: 2-Propenamide in DMSO.
After saturating all flasks with nitrogen and adding hydroperoxide to Flask 1,
a. Add $H_2O_2$ to Flask 1 and stir for 5 minutes,
b. Add contents of Flask 3 to Flask 1 and stir for 3 minutes, and
c. Add contents of Flask 2 to Flask 1 and stir for an additional 5 minutes, all under a nitrogen blanket.
d. After allowing 48 hours for reaction, quench the reaction with hydroquinone.
After quenching with hydroquinone, the product is subjected to centrifugation. This process gives two portions: water soluble and water insoluble parts. Each portion is dialyzed and freeze-dried as before to give products.

TABLE 8

Typical Reaction Setup

| | Run 1 | Run 2 | Run 3 |
|---|---|---|---|
| 1. Example Number | 11 | 12 | 13 |
| Weight of Lignin (g) | 19.92 | 19.92 | 19.92 |
| Weight of 2-Propenamide (g) | 5.94 | 4.31 | 3.19 |
| Weight of HEM-5 (g) | 2.60 | 4.23 | 5.35 |
| Total Weight (g) | 28.46 | 28.46 | 28.46 |
| Molar Ratio of HEM-5 to 2-Propenamide | 1/9 | 2/8 | 3/7 |

2. Solvent: 82.5 mL DMSO
3. Salt: $CaCl_2$, 1.50 grams
4. Initiator: 2.40 mL $H_2O_2$
5. Temperature: 30° C.

TABLE 8-continued

Typical Reaction Setup

|  | Run 1 | Run 2 | Run 3 |
|---|---|---|---|
| 6. Reaction Time: 48 Hours | | | |

TABLE 9

Results for Reactions of Table 8

| Example Number | 11 | | 12 | | 13 | |
|---|---|---|---|---|---|---|
| Weight of Portions (g) | | | | | | |
| Soluble | 3.57 | | 3.29 | | 3.86 | |
| Insoluble | 12.83 | | 13.67 | | 13.06 | |
| Total Weight (g) | 16.40 | | 16.96 | | 16.92 | |
| Total Yield (wt. %) | 57.62 | | 59.59 | | 59.45 | |
| Nitrogen Analysis by Kjeldahl Method Show: | | | | | | |
|  | Sol | Ins | Sol | Ins | Sol | Ins |
| N % | 4.59 | 1.07 | 2.24 | 0.67 | 1.71 | 0.87 |
| UV Spectra give: | | | | | | |
| Lignin, % by weight | 54.35 | 67.34 | 51.89 | 69.71 | 49.71 | 67.43 |

TABLE 10

Same Reaction as Table 8 but with Careful Saturation of Nitrogen and with Fresh $H_2O_2$

|  | Run 1 | Run 2 | Run 3 |
|---|---|---|---|
| Example Number | 14 | 15 | 16 |
| Weight of Portions (g) | | | |
| Soluble | 4.57 | 6.14 | 4.23 |
| Insoluble | 15.87 | 14.60 | 17.73 |
| Total Weight (g) | 20.44 | 20.74 | 21.96 |
| Total Yield (Weight Percent) | 71.82 | 72.87 | 77.16 |

Examples 11 to 16 show that water insoluble plastics can be formed with this technology. When the mole ratio of amide monomer to hydroxyl containing monomer is numerically less than 1 (1/1), the resulting polymer is a plastic which is insoluble in water and other solvents. This unique behavior as a function of monomer ratio in the reaction mixture allows this new compound to be used to make solid objects and articles of manufacture. It also allows these high-lignin-content solids to be used to make gelled (solvent-swollen) networks for applications in membranes, immobilants, and fluid absorbers. Further, these copolymers can be heated above their glass transition temperature to be blended into other reagents in common, bulk-phase polymerization reactions such as the formation of urethanes from isocyanates and polyols. In such a reaction, the copolymer is taking the role of polyol.

Other halide salts are useful in running the reaction, as shown by the data of Table 11. As these results show, yields of copolymer of between 30 and 90 weight percent are common when different halide salts are used as coinitiators in the reaction. Example numbers are listed in parenthesis after the sample number.

TABLE 11

Use of Different Salts with Hydrogen Peroxide to Initiate the Synthesis of Copolymer

| Sample Number | Lignin (g) | Salt Used | Salt (g) | 2-propen amide (g) | Percent Yield | % Lignin in Copolymer | Percent N in Copolymer |
|---|---|---|---|---|---|---|---|
| 27-115-1(17) | 0.50 | $CaCl_2$ | 1.52 | 4.31 | 89.8 | 7.70 | 14.55 |
| 27-115-2(18) | 0.50 | $CaCl_2$ | 1.52 | 2.87 | 78.4 | 10.68 | 15.43 |
| 27-115-3(19) | 0.50 | $CaCl_2$ | 1.52 | 1.44 | 82.6 | 16.91 | 12.78 |
| 28-15-2(20) | 0.4918 | KBr | 1.5529 | 2.8541 | 29.28 | 19.89 | |
| 28-15-3(21) | 0.5051 | KBr | 1.3549 | 1.4581 | 25.47 | 46.62 | |
| 28-16-4(22) | 0.51 | LiF | 0.34 | 4.35 | 43.41 | 21.88 | |
| 28-16-5(23) | 0.50 | LiF | 0.30 | 2.82 | 89.15 | 15.71 | |
| 28-16-7(24) | 0.49 | LiF | 0.28 | 1.45 | 90.21 | 29.62 | |

*27.5 mL of DMSO was charged to each reaction. Percent lignin in copolymer was determined using U.V. spectrophotometer.

As already noted, the grafted side chain or chains are made of random units of 2-propenamide and 2-methyl-3-oxo-4-oxybut-1-ene-(p-ethoxy-(3*p+3)-ol. Moreover, the actual content of the grafted side chain or chains depends upon the molar ratio of monomer reactants employed. According to the present invention, it is acceptable to use from about 0.0 to 100 molar percent of 2-propenamide and from about 0.0 to 100 molar percent of 2-methyl-3-oxo-4-oxybut-1-ene-(p-ethoxy-(3*p+3)-ol, respectively. The grafted side chain or chains appear to attache one or more of the 2-, 5- or 6- aromatic ring positions on the oxyphenylpropylene moiety. Of course the precise content of the grafted side chain or chains depends upon the contemplated use. For example, in uses where water solubility is required, more of the 2-propenamide monomer should be used. Conversely, where less water solubility and more plastic or elastomer character is desired, more of the 2-methyl-3-oxo-4-oxybut-1-ene-(p-ethoxy-(3*p+3)-ol monomer should be used.

The lignin graft copolymer has primary hydroxyl groups at the ends of the ethoxylate ester chains of the graft. These functional units react well with a number of compounds and materials. An example of this reactivity would be the reaction between the copolymer and an isocyanate, R—N=C=O, where R is an organic or inorganic moiety which may contain other functional groups, including another isocyanate group. A typical product of an isocyanate and a polyol-grafted lignin would have urethane structures in the molecule. It would be a thermoplastic material when reacted with a monofunctional or difunctional isocyanate at low isocyanate to polyol mole ratios (<0.5) but would be a cross-linked, thermoset solid at higher isocyanate functionalities or higher isocyanate to polyol mole ratios (>0.5). A typical reaction would be:

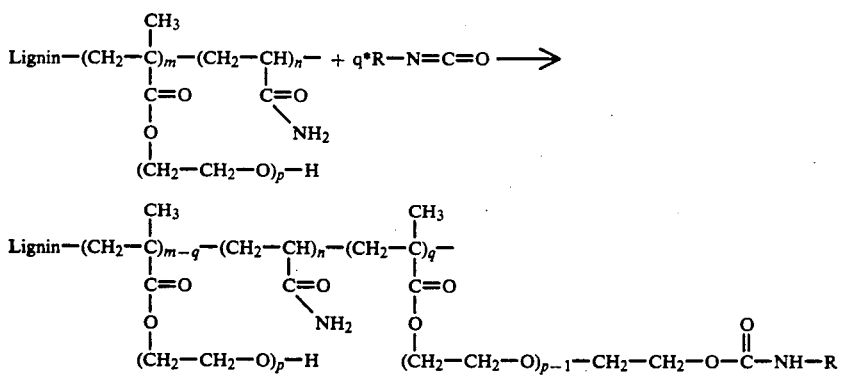

Structure 6

The isocyanate will also react with some hydroxyl groups on the lignin but the bulk of the reactions will occur on the primary hydroxyl groups terminating the ethoxyl chains, O—CH$_2$CH$_2$—OH. The reaction of polyol grafted lignin with isocyanates will now be demonstrated for samples containing 0.1 to 5 weight percent isocyanate, 0.1 to 10 weight percent lignin graft copolymer, less than 1 percent amine catalyst, and 80 to 99.9 weight percent solvent.

EXAMPLE 25

A total of 0.9928 g of phenylisocyanate was added to 100 mL of dry toluene and dissolved. This was sample 28-77-1. The concentration of the isocyanate was tested by addition of a known quantity of n-butylamine and titration of the excess amine with 0.100M, aqueous HCl. At a molecular weight of 40.90 for the N=C=O group and a molecular weight of 119.12 g per mole of phenylisocyanate, the titration should have taken 5.88 mL of acid. It took 5.73 mL of acid, implying that the phenylisocyanate was only 97.39 mole percent active. The warmed isocyanate solution was added to a warmed suspension of lignin graft copolymer and the mixture maintained at 60° C. The suspension was 1.0017 g of 28-22-3 copolymer, the product of example 3, which has been mixed with 25 mL of dry toluene and allowed to stir overnight.

The mixture contained 2×10$^{-5}$ mole per liter T-12 amine catalyst for promotion of the isocyanate-polyol reaction. During the next hour, the reaction was monitored for isocyanate content by regular withdrawal of small portions of the reaction mixture, addition of 10 mL of n-butylamine and titration of the excess amine with 0.100M, aqueous HCl. The data on the kinetics of the polyol-isocyanate reaction are given in Table 12.

TABLE 12

| Kinetic Data on the Reaction of Phenylisocyanate with Lignin-Graft-(2-propenamide-HEM-p) | | | | |
|---|---|---|---|---|
| Time of Sampling (sec.) | Volume, (mL) Taken from Reaction | For Titration | Percent Isocyanate Remaining | [—N=C=O] Remaining |
| 1030 | 10.00 | 5.90 | 32.91 | 0.0389 |
| 1870 | 10.00 | 6.40 | 28.76 | 0.0370 |
| 2700 | 6.00 | 8.10 | 24.15 | 0.0285 |
| 3500 | 5.00 | 9.55 | 4.69 | 0.0055 |

In Table 12, the "Percent of Isocyanate Remaining" is the weight percent of phenylisocyanate that is isocyanate units at that point in the reaction. The column labeled [—N=C=O] is the molar concentration of isocyanate groups in the solution. The volumes listed are the aliquot of reaction mixture taken for titration and the amount of titrant used in the tritration. The above data shows that isocyanate units react with the lignin polyol graft copolymer rapidly at 60° C. and the reaction is essentially over after one hour. The reaction was repeated with product 28-31-1, example 5.

EXAMPLE 26

A total of 1.0035 g of 28-31-1 was placed in a three neck, round bottom flask and slurried in 30 mL of toluene. Added 31.13 mL of 28-77-1 and ran the reaction at 60° C., as described in Example 25, for 2 hours. The data for the reaction is given in Table 13.

TABLE 13

| Kinetic Data on the Reaction of Phenylisocyanate with Ungrafted (2-propenamide-HEM-5) | | | | |
|---|---|---|---|---|
| Time of Sampling (sec.) | Volume, (mL) Taken from Reaction | For Titration | Percent Isocyanate Remaining | [—N=C=O] Remaining |
| 1426 | 5.00 | 8.15 | 7.45 | 0.0088 |
| 2030 | 5.00 | 8.2 | 6.83 | 0.0081 |
| 2820 | 5.00 | 8.35 | 6.20 | 0.0073 |
| 3800 | 5.00 | 8.52 | 5.49 | 0.0065 |
| 4860 | 5.00 | 8.75 | 4.52 | 0.0053 |
| 5830 | 5.00 | 8.90 | 3.89 | 0.0046 |

The above data shows that isocyanate units react with the polyol side chain in the graft copolymer and do so readily at 60° C. This data was plotted using a first order rate equation, with time in minutes, to obtain a slope of 1.4101 and a y-intercept of 49.79. The correlation coefficient of the data set was 0.9887. This data shows that lignin polyols react with isocyanates at a rate determined by the molar concentration of isocyanate. Example numbers are listed in parenthesis after the sample number.

TABLE 14

| Copolymer Reactions with Phenylisocyanate | | | | |
|---|---|---|---|---|
| Sample Copolymer Number | Lignin Copolymer Number | Phenyl Isocyanate Solution, (g) mL | T-12 Amine Catalyst (mL) | Yield Adduct |
| 28-106-1(27) | 28-26-4 | 0.9935 15.76 | 0.5 | 1.1078 |
| 28-107-1(28) | 28-26-3 | 1.0120 18.5 | 0.5 | 1.0725 |
| 28-108-1(29) | 28-26-2 | 1.0000 19.3 | 0.5 | 1.1185 |
| 28-109-1(30) | 28-26-1 | 0.9969 20.76 | 0.5 | 1.0717 |
| 28-113-1(31) | 28-22-2 | 1.0120 33.75 | 0.5 | 1.1893 |

The samples of Table 14 are isocyanate adducts of lignin polyols and contain urethane linkages, Structure 7

and Sons, New York, 1974, ISBN 0-471-79177-6 and Sadtler Research Laboratories, Philadelphia, Pa., (1980), ISBN 0-8456-0064-8 for assignment of absorbance peaks.

TABLE 15

Spectra Peaks of Copolymers Reacted with Phenylisocyanate

| Sample Number | Wavelength Of Peak in Micrometers | Peak Shape | Strength of Absorbance | Functional Group Absorbing | Motion Induced By Light |
|---|---|---|---|---|---|
| 28-22-1(1) | 2.941 | Broad | Strong | H-Bonded Hydroxyl | O-H-O Stretch |
|  | 3.448 | Sharp | Strong | CH Ether | Stretch |
|  | 5.780 | Sharp | Strong | Carbonyl | Stretch |
|  | 6.897 | Sharp | Medium | CH2, Ether | Deformation |
|  | 7.407 | Sharp | Medium | COH, Alcohol | Deformation |
|  | 9.090 | Broad | Strong | COC, Ether | Stretch |
| 28-87-1(32) | 2.941 | Broad | Medium | H-Bonded Hydroxyl | O-H-O Stretch |
|  | 3.448 | Sharp | Weak | CH Ether | Stretch |
|  | 5.814 | Sharp | Strong | Carbonyl | Stretch |
|  | 6.472 | Sharp | Medium | N, Amide | Bending |
|  | 8.064 | Sharp | Medium | NCO, Urethane | Stretch |
|  | 9.090 | Broad | Strong | COC, Ether | Stretch |

The definition of adduct is that the isocyanate group has reacted with the polyol hydroxyl group to form a urethane structure, Structure 7. This was shown clearly by the infrared spectra of the isocyanate-reaction products. The infrared data from two spectra are listed in Table 15. The reaction products had absorptions at 5.814, 6.472, and 8.064 micrometers where the lignin polyols have an absorption peak at 2.941, 3.448, and 9.090 micrometers. The infrared absorption at 5.814, 6.472, and 8.064 micrometers is a well known feature of urethane structures while those at 2.941, 3.448, 7.407, and 9.090 micrometers are characteristic of a polyether with primary hydroxyl groups. The reduction in absorbance of the peaks characteristic of primary hydroxyl groups, 2.941 and 7.407 micrometers, and the appearance of peaks characteristic of urethane structures all imply the synthesis of structure 7 in this reaction. Thus, example 32 shows that the reaction of lignin polyols, formed by the art disclosed above, with compounds containing one or more isocyanate groups yields urethanes. See R. M. Silverstein, G. C. Bassler, and T. C. Morrill, "Spectrometric Identification of Organic Compounds", Third Edition, pp. 104–111, p. 147, John Wiley This is a very versatile reaction, as shown by the data of Table 16. As this data shows, the synthesis can be run with a broad spectrum of mole ratios between reagents and concentrations of reactants. Yield of product and conversion of monomer can be increased if the reaction is stirred. Example numbers are listed in parenthesis after the sample number.

TABLE 16

Synthesis of Poly(lignin-g-(2-propenamide-co-polyol))@
(Five oxyethylene units per propenoic repeat unit)

| Sample (Example) Number | lignin (g) | CaCl2 (g) | 2-propen amide (g) | Hydro Peroxide (mL) | Polyol type | Amount of polyol (g) | Product Yield (Wt./%) | Nitrogen Content Sol/Insol |
|---|---|---|---|---|---|---|---|---|
| 34-100-1a(33) | 2.05 | 0.10 | 0.95 | 0.46 | HEM-5 | 0.42 | 2.10/61.4 | 4.34/1.63 |
| 34-100-1b(34) | 2.05 | 0.20 | 0.95 | 0.46 | HEM-5 | 0.42 | 2.19/64.0 | 2.73/1.08 |
| 34-100-2a(35) | 2.05 | 0.10 | 0.69 | 0.46 | HEM-5 | 0.67 | 1.63/47.7 | 4.29/1.01 |
| 34-100-2b(36) | 2.05 | 0.20 | 0.69 | 0.46 | HEM-5 | 0.67 | 1.86/54.4 | 3.10/1.19 |
| 34-100-3a(37) | 2.05 | 0.10 | 0.51 | 0.46 | HEM-5 | 0.86 | 1.93/56.4 | 2.57/1.06 |
| 34-100-3b(38) | 2.05 | 0.20 | 0.51 | 0.46 | HEM-5 | 0.86 | 1.75/51.2 | 2.40/0.90 |
| 34-107-1(39) | 2.05 | 0.40 | 0.95 | 0.46 | HEM-5 | 0.42 | 1.80/52.6 | 5.47/0.79 |
| 34-107-2(40) | 2.05 | 0.40 | 0.69 | 0.46 | HEM-5 | 0.67 | 1.77/51.8 | 2.55/0.76 |
| 34-107-3(41) | 2.05 | 0.40 | 0.51 | 0.46 | HEM-5 | 0.86 | 1.63/47.7 | 1.35/0.79 |
| 34-109-1(42) | 2.05 | 0.50 | 0.95 | 0.46 | HEM-5 | 0.42 | 2.02/59.1 | 6.72/0.83 |
| 34-109-2(43) | 2.05 | 0.50 | 0.69 | 0.46 | HEM-5 | 0.67 | 2.20/64.3 | 4.48/1.03 |
| 34-109-3(44) | 2.05 | 0.50 | 0.51 | 0.46 | HEM-5 | 0.86 | 1.96/57.3 | 2.96/0.84 |
| 34-103-1(45) | 2.05 | 0.70 | 0.95 | 0.46 | HEM-5 | 0.42 | 1.80/52.6 | 6.25/1.41 |
| 34-103-2(46) | 2.05 | 0.70 | 0.69 | 0.46 | HEM-5 | 0.67 | 2.16/63.2 | 3.44/1.05 |
| 34-103-3(47) | 2.05 | 0.70 | 0.51 | 0.46 | HEM-5 | 0.86 | 1.56/45.6 | 1.32/0.34 |
| 34-105-1(48) | 2.05 | 0.80 | 0.95 | 0.46 | HEM-5 | 0.42 | 1.35/39.5 | 4.21/0.85 |
| 34-105-2(49) | 2.05 | 0.80 | 0.69 | 0.46 | HEM-5 | 0.67 | 1.22/53.2 | 3.69/1.30 |
| 34-105-3(50) | 2.05 | 0.80 | 0.51 | 0.46 | HEM-5 | 0.86 | 2.03/59.4 | 1.74/0.84 |

The molecular weight of the soluble, solid, or cross-linked lignin copolymers of the present invention are in the range of about 40,000 to about 300,000 as determined by size exclusion chromatography using known techniques. Under the process conditions of the present invention, already described, it is possible to obtain molecular weights of about 40,000 to 3,000,000. Under these conditions, the polymer molecular weight is generally increased by increasing the ratio of moles of monomer to moles of hydroperoxide. The converse is true when diminishing the molecular weight. However, by utilizing another aspect of the present invention, it has now been found possible to greatly boost or increase the molecular weight of the growing polymer during polymerization by conducting the reaction in a low monomer I to monomer II mole ratio state.

Generally, the gelled state can be formed by essentially repeating the procedures already described for synthesizing the graft copolymer, but by reducing the amounts of 2-propenamide and increasing the amounts of 2-methyl-3-oxo-4-oxybut-1-ene-(p-ethoxy-(3*p+3)-ol. In other words, instead of using about 2.55 g of monomer I for the reaction as described in Example 1, about 1.0 less grams are used instead. It has been theorized that by conducting the polymerization reaction in this low monomer I to monomer II mole ratio state, the propagation reaction continues but some crosslinks develop between the copolymers. In general, the gelling of the reaction mixture occurs at room temperature with no heating being necessary. Reaction times are somewhat variable and on the order of from 1 to about 48 hours with reaction yields as high as 80 weight percent possible in about 1 hour.

Although the polymerization reaction of the present invention is a free-radical polymerization, the scope of the present invention clearly extends the concept of gel-state reactions to other types of polymerization reactions such as ionic or chain polymerizations.

Having now fully described this invention, it will be apparent to one of ordinary skill in the art, that many changes and modifications can be made thereto without departing from the spirit or scope of the invention as set forth herein.

We claim:

1. A graft copolymer of lignin-(2-propenamide)-(2-methyl-3-oxo-4-oxybut-1-ene-(p-ethoxy-(3*p+3)-ol) having a central lignin network and at least one grafted side chain, R, having randomly repeating units of the formulas:

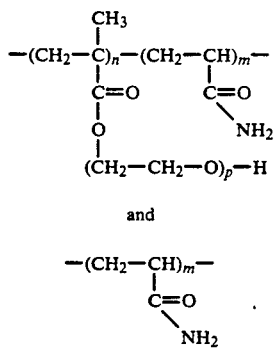

where the number of ethoxyl repeat units, p, in the polyol repeat unit is greater than one and up to about 300,000, such that the central lignin network has a molecular weight of about 1,000 to 150,000 and the total number of randomly repeating units in the grafted side chain or chains is up to about 300,000 units, such that the total graft copolymer molecular weight is in the range of 15,000 to 300,000,000 where m and n are each integers with a value greater than zero and not more than 300,000, and the symbol * stands for multiplying.

2. A graft copolymer according to claim 1 wherein the lignin used as the central network is selected from the group consisting of alkali lignin, HCl lignin, acid lignin, Klassen lignin, solvent-extracted lignin, steam-explosion lignin, milled wood lignin (MWL) and 1,4-dioxane lignin derived from grasses, softwoods, or hardwoods.

3. A graft copolymer according to claim 2 wherein said lignin is one of an alkali lignin and steam-explosion lignin.

4. A graft copolymer according to claim 3 wherein said graft copolymer has the following structural formula:

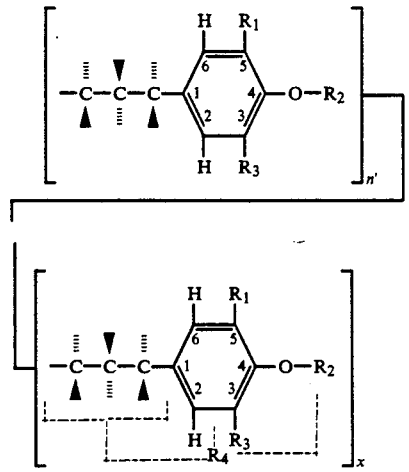

where n' is defined such that the central lignin network has a molecular weight of about 1,000 to 150,000; and wherein said grafted side chain, $R_4$, has randomly repeating units of the formula:

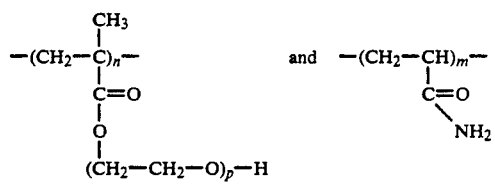

such that p is in the range of 1 to 300,000 and the total number of randomly repeating units in the grafted side chain equals the sum of n plus m, (=n+m), and the number of monomer repeat units in the molecule equals x times n plus m, or chains (=x*[n+m]) is in the range of 1 to 300,000, such that the total copolymer molecular weight is in the range of 1,000 to 300,000,000.

5. A graft copolymer according to claim 4 wherein x is in the range of 1 to 500.

6. A graft copolymer according to claim 1 with a glass transition temperature which is reduced as the value of p increases.

7. A graft copolymer of lignin according to claim 6 wherein p is in the range of 1 to 1,000.

8. An gelatenous crosslinked a graft copolymer according to claim 1 which is gelatenous and has a mole ratio of 2-propenamide to 2-methyl-3-oxo-4-oxybut-1-ene-(p-ethoxy-(3*p+3)-ol in the synthesis mixture which is less than 1.

9. Lignin containing urethanes formed by reacting the graft copolymer according to claim 1 with a molecule containing at least one isocyanate functional group, —N=C=O.

10. Plastics comprising a graft copolymer of lignin according to claim 1.

11. Articles of manufacture comprising a graft copolymer of lignin according to claim 1.

* * * * *